United States Patent [19]

Calvert

[11] Patent Number: 4,662,647
[45] Date of Patent: May 5, 1987

[54] VEHICLE HITCH ASSEMBLY

[76] Inventor: Larry J. Calvert, 254 Emerling, Cool Valley, Mo. 63121

[21] Appl. No.: 796,228

[22] Filed: Nov. 8, 1985

[51] Int. Cl.$^4$ .............................................. B60D 1/06
[52] U.S. Cl. ............................ 280/490 R; 280/491 E; 280/511; 280/415 A
[58] Field of Search .............. 280/490 R, 491 E, 511, 280/415 A, 415 R

[56] References Cited

U.S. PATENT DOCUMENTS

| | | | |
|---|---|---|---|
| 2,706,644 | 4/1955 | Black | 280/490 R |
| 4,266,799 | 5/1981 | Wood | 280/490 R |
| 4,280,713 | 7/1981 | Bruhn | 280/490 R |
| 4,441,731 | 4/1984 | Belsky et al. | 280/490 R |
| 4,456,279 | 6/1984 | Dirck | 280/511 |

Primary Examiner—John J. Love
Assistant Examiner—Donn McGiehan
Attorney, Agent, or Firm—Rogers, Howell, Moore & Haferkamp

[57] ABSTRACT

An adjustable hitch assembly for attachment to motor vehicles has a front receiver tube mounted horizontally to the rear of vehicle with angle irons having their horizontal legs secured to the vehicle. The depending legs of the angles have holes therethrough which are aligned with a hole extending through the front receiver tube. An intermediate ensemble comprising a slide bar having a passageway therethrough, the bar telescopically sliding within the front receiver tube. The intermediate ensemble has a vertically oriented rear receiver tube secured to the slide bar, the rear receiver tube has openings therethrough. A "T" shaped mount ensemble has a transverse mount plate with a depending mount bar extending therefrom, the mount bar having passageways therethrough so that the mount bar can be inserted through either the upper or lower opening in the ends of the rear receiver tube and slid to a selected height position in the mount bar being aligned with openings in the receiver tube so that a lock pin can be inserted.

7 Claims, 5 Drawing Figures

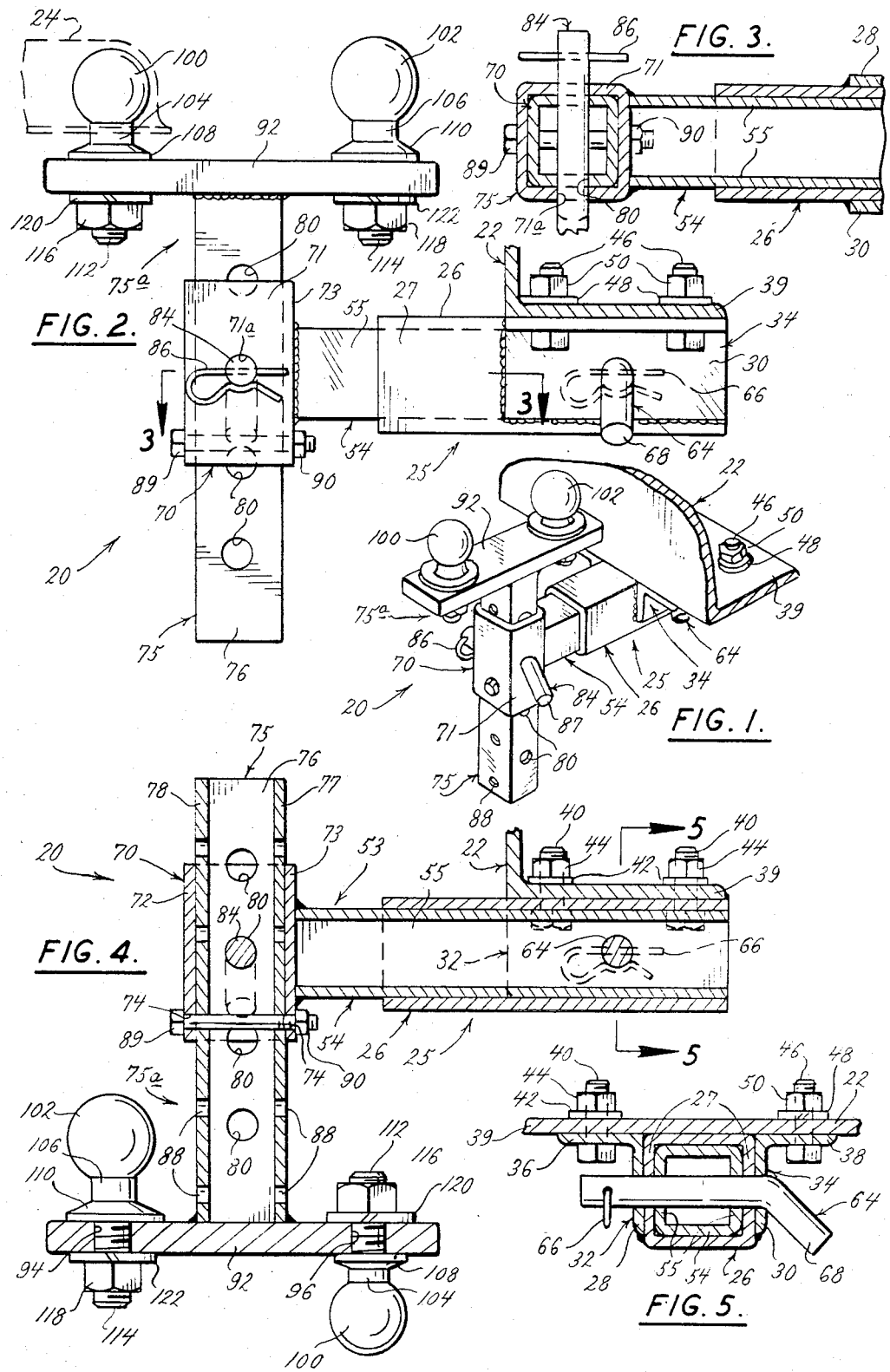

VEHICLE HITCH ASSEMBLY

BACKGROUND AND SUMMARY OF THE INVENTION

This invention relates to adjustable hitches for attachment to motor vehicles for the purpose of towing or hauling a movably mounted load such as a trailer, cart or another vehicle.

In the prior art a horizontal receiver tube has been secured to the bumper or rear plate of a vehicle. In this prior device, the receiver tube is itself welded to a separate flat plate and the separate plate is secured as by bolts to the vehicle bumper or rear vehicle plate. The receiver tube has a pair of holes in opposite walls so that a bar likewise having holes extending therethrough can be slidingly received within the receiver tube, with a pin inserted through the holes in the receiver tube and in the bar to securely hold the slide bar within the receiver tube. However, this device has the disadvantage that should the receiver tube become detached from the mounting plate through the welds breaking, the receiver tube and the slide bar, and thus the trailer or other object to which the slide bar is connected, become detached from the vehicle and thus can roll off the road and crash into the surrounding environment such as telephone poles or trees and suffer great damage.

In the prior art there is also the use of an EAZ-LIFT brand adjustable hitch which has a horizontal slide bar with a vertical tube secured thereto as by welds. A gusset connects the slide bar to the vertical tube at the corner of one of the junctions thereof. The vertical tube has a plurality of pairs of aligned holes. An L-shaped hitch ball support has a horizontal rear end that has a hitch ball mounted thereto, and has a vertical leg that has a pair of flanges projecting forwardly therefrom which extend along two of the sides of the vertical tube connected to the slide bar. The flanges have two pairs of aligned holes for alignment with a selected two pairs of holes in the vertical tube, with two bolts passing through the two sets of aligned holes to hold the L-shaped ball support at various selected positions relative to the vertical tube. With this device there is no benefit of a fully enclosed supporting structure, since the two flanges and the vertical leg of the ball support only extend around three-fourths of the vertical tube. Additionally, the mounting of the hitch balls on opposite sides of the flange portions is impaired, because even if the horizontal part of the ball support were extended beyond the flanges, such a modified ball hitch would severely limit the range of sliding adjustability of the ball support, since such a modified ball support would strike the bottom of the vertical tube to prevent further upward movement. Because the flanges do not entirely extend about the vertical tube, it is necessary to have two pins passing through the flanges and through the vertical tube in order to prevent severe pivoting of the ball support relative to the vertical tube and the resulting banging of the ball support against the vertical tube. The use of the two pins to attach the ball support which pins are necessarily positioned below and above one another also limits the range of vertical adjustability of the hitch.

The present invention improves over the prior art. It comprises a front receiver tube which can be mounted horizontally to the rear bumper or plate of a vehicle as by angle irons. The angle irons have their upper horizontal legs secured as by bolts to the bumper and have their vertical legs secured such as by welding to the front receiver tube. The depending legs of the angles have aligned holes therein which also are aligned with a pair of holes extending through the front receiver tube.

The invention has a substantially vertical rear receiver tube which is secured to an horizontal slide bar. The slide bar fits telescopically within the front receiver tube. The slide bar has a pair of holes for alignment with the holes in the angle legs and in the first receiver tube so that an angled lock pin can pass through the holes and be secured by a spring clip to hold the slide bar securely to the vehicle. The rear receiver tube has a first pair of holes in opposite facing walls.

A separate mount tube interacts with the rear receiver tube. The mount tube has one end connected to a mount plate which plate mounts a pair of hitch balls. The mount tube has a first set of plurality of pairs of aligned holes. The mount tube is sized so to be slidingly and telescopically received within the rear receiver tube so that any one of the pair of the mount tube holes can be aligned with the first pair of holes in the rear receiver tube to permit a second angled lock pin to telescopically pass therethrough and be engaged by a spring clip to firmly hold the mount tube and the mount plate in a selected position. This allows a great range and adjustability for the mount tube and mount plate. The rear receiver tube is open at its upper and lower end so that the mount tube can be inserted through either the upper or lower end and thus the mount plate can be mounted to be either or above or below the rear receiver tube. The same second lock pin can be used to telescopically pass through a selected pair of plurality of holes in the mount tube and through the holes in the rear receiver tube in either the lower or upper mount tube position to hold the mount tube and mount plate in the selected position.

A locking and anti-sliding rod is also provided. A second plurality of pairs of holes extend in oppositely facing walls of the mount tube, preferably in a different pair of walls than the ones through which the holes extend for reception of the locking pin. The rear receiver tube can likewise have a second pair of aligned holes in oppositely facing walls so that a selected pair of the second set of holes in the mount tube can be aligned with the second pair of holes in the rear receiver tube and a locking rod such as a bolt telescopically passed therethrough and secured by a nut to further hold the mount tube and mount plate in a selected position. The second set of holes in the mount tube and second pair of holes in the rear receiver tube can be smaller than the first set of holes.

The mount plate in the embodiment illustrated is mounted to the mount tube to form a T shape so that hitch balls can be mounted to the mount plate on both sides of the mount tube. The hitch balls can be different sizes and can be detachably mounted to the mount plate so that they can be positioned on either the exterior side of the mount plate or the interior side of the mount plate. Thus when the position of the mount tube and mount plate are reversed relative to the second receiver tube, a selected hitch ball can also have its position reversed relative to the mount plate so that it can be used with the mount plate in either the upper or the lower position. A coupler for the trailer or other thing to be towed can be connected to the hitch ball.

With the present invention, the mounting of the horizontal front receiver tube to the vehicle via the angle members and pin overcomes the problem of a weld breaking between a mounting member such as the angle and the front receiver tube. If the weld between the angles and the front receiver tube breaks, the slide bar and the rest of the hitching assembly will nevertheless remain attached to the vehicle by virtue of the lock pin which extends through the angles and through the horizontal front receiver tube and to the slide bar. This provides a great advantage in safety and in avoiding the ruinous damage which follows from an accident with a runaway trailer or vehicle.

The invention further provides the advantage of having the mount tube fully enclosed by the rear receiver tube so that all the walls of the rear receiver tube resist outward movement of the mount tube when forces are applied to the mount tube to force it against one part or another of the rear receiver tube. The use of the rear receiver tube rather than the flanged assembly of the prior art also permits a single lock pin passing through the mount tube and through the rear receiver tube to securely hold the mount tube and to prevent wobbling and banging. The fact that the mount tube has its sides in contact on all four sides with the rear receiver tube from the top to the bottom of the rear receiver tube, resists any wobbling tendency.

The use of the rear receiver tube and the mount tube with the single pin which provides for the reversible characteristic of the mount tube relative to the rear receiver tube permits a great versatility in the range at which the mount plate can be positioned.

The mount tube and rear receiver tube combination further provides ease in having the mount plate attached to the end of the mount tube so that hitch balls can be placed on either side of the mount tube on either the interior or exterior side of the mount plate to thus give greater versatility, and to avoid having to constantly be changing the size of the hitch balls.

The locking and anti-sliding rod prevents sliding of the mount tube within the rear receiver tube, and should the second lock pin be removed by a vandal, or become accidentally disengaged or broken, the rod will continue to engage the mount tube to the rear receiver tube.

The present invention thus offers advantage features in safety and in efficient operation and use.

DESCRIPTION OF THE DRAWINGS

FIG. 1 is an orthogonal projection of the hitch assembly shown mounted to the bumper or rear part of a vehicle, without the holes being shown in the mount tube;

FIG. 2 is a side elevation of the bumper assembly so mounted, with a coupler shown in hidden lines attached to a hitch ball;

FIG. 3 is a section taken along the line 3—3 of FIG. 2;

FIG. 4 is a vertical section of the hitch assembly taken through the vertical center of the assembly as mounted to the vehicle; and FIG. 5 is a section taken along the line 5—5 of FIG. 4.

DESCRIPTION OF THE PREFERRED EMBODIMENT

The drawings show the hitch assembly 20 with its front mounted to an angle plate or bumper 22 of the rear portion of a motor vehicle and with a coupler 24 shown mounted to the rear of the assembly 20. The assembly 20 comprises a front receiver ensemble 25 which includes a front horizontal receiver tube 26 of square cross-section which has vertical wide walls 27. The vertical legs 28 and 30 of a pair of angle irons 32 and 34 respectively, which also comprise the front ensemble 25, are secured to the sides of tube 26 as by welds. The horizontal leg 36 of angle 32 has a pair of vertical bores which are aligned with matching pairs of bores in the horizontal flange 39 of bumper plate 22 so that a pair of bolts 40 can extend therethrough and be secured thereto as by washers 42 and nuts 44. On the opposite side of receiver tube 26, a pair of bolts 46 pass through aligned bores in angle horizontal leg 38 and in flange 39 and are secured thereto by washers 48 and nuts 50.

The hitch assembly 20 further comprises an intermediate receiver ensemble 53 that includes a horizontal tubular slide bar 54. Bar 54 is telescopically and slidingly received within the receiver tube 26. As seen more clearly in FIG. 5, bar 54 has two vertical walls 55 which have aligned circular bores which form a transverse passageway through bar 54 therethrough. Bar 54 can be slid within receiver tube 26 so that the bores in walls 55 are aligned with circular bores of the same size in each of the vertical walls 27 of the receiver tube 26, which bores are likewise aligned with a pair of circular bores of the same size extending through each of the angle legs 28 and 30 so that a first hitch pin 64 can telescopically extend through each of the said bores in slide bar 54, receiver tube walls 27 and angle legs 28 and 30 to hold the slide bar 54 firmly and securely within receiver tube 26 and thus firmly to the vehicle plate 22 and to the entire vehicle. A looped spring clip 66 has its straight end passing through a hole in the inner end of hitch pin 64 to act with the slanted end 68 of the hitch pin 64 to prevent pin 64 from sliding loose from the slide bar walls 55, receiver tube walls 27 and angle legs 28 and 30.

Ensemble 53 further includes an intermediate vertical receiver tube 70 secured as by welds to the rear end of the slide bar 54. Tube 70 is of square cross section with a pair of sidewalls 71, and a pair of front and rear walls 72 and 73. Side walls 71 each have a pair of matching sized aligned holes 71a. Walls 72 and 73 each have aligned bores 74 therethrough which bores are smaller than holes 71a. Bar 54 and tube 70 together form a "T" configuration. The alignment of the receiver tube 26 with the vehicle bumper or plate 22 is such that the receiver tube 70 extends substantially vertical relative to the road, pavement or ground directly therebeneath, while bar 54 and the receiver tube 26 extend substantially horizontal relative thereto.

A mounting ensemble 75a comprises a vertical mount tube 75 having a pair of sidewalls 76, and front and rear walls 77 and 78, respectively. The side walls 76, as seen in FIGS. 2 and 4, for example, can have a plurality of pairs of aligned holes 80 of the same size, extending therethrough with the mount tube 75 being telescopically slidingly received within receiver tube 70 so that a selected pair of the holes 80 can be aligned with the pair of holes 71a in the sides walls 71 of the tube 70 to allow a second hitch pin 84 to extend therethrough. A spring clip 86 passes through a bore in the straight end of pin 84, to act with the slanted end 87 of the hitch pin 84 to prevent disengagement of the pin 84.

The front and rear walls 77 and 78 of mount tube 75 each have a plurality of bores 88 arranged in aligned pairs. The bores 88 are of the same diameter as bores 74 in tube 70. The bores 88 are spaced vertically from the holes 80 in tube 75 so that when pin 84 extends through a selected pair of holes 80 and through the pair of holes 71a in side walls 71 of receiver tube 70, a pair of corresponding bores 88 are aligned with the pair of bores 74 in walls 72 and 73 of receiver tube 70.

The shaft of a bolt 89 can telescopically pass through the selected pair of bores 88 and the bores 74, and be secured by a nut 90.

At the top of mount tube 75 (as shown in the mount tube position for FIGS. 1 and 2) there is firmly mounted thereto as by welds a horizontal mount plate 92 which has extending through both of its ends vertical bores 94 and 96 (shown in section in FIG. 4 with plate 92 in the reverse position). The plate 92 and mount tube 75 form a "T" configuration, with the interior side of plate 92 facing the mount tube 75, and the exterior side of mount plate 92 facing away from mount tube 75. A smaller hitch ball 100 and a larger hitch ball 102 each have shanks 104 and 106 respectively, which extend into integral flared skirts 108 and 110 which, when the plate 92 is shown in the upper position of FIG. 2, rest against the exterior side of the plate 92. The shanks 108 and 110 extending into bolt sections 112 and 114, as known in the art. Nuts 116 and 118 are threaded onto the bolt ends 112 and 114 respectively to press against washers 120 and 122, respectively, to hold the balls 100 and 102 securely to mount plate 92.

In the sectional view of FIG. 4, the position of the mount tube 75 is shown reversed from top to bottom so that the mount plate 92 is underneath the vertical receiver tube 70, and the ends of mount plate 92 are shown reversed from front to rear. FIG. 4 further shows that the position of the hitch ball 102 relative to the plate 92 has been reversed.

A coupler 24 as seen in FIG. 2, which is connected such as through a tow bar to a trailer or other rolling device to be towed or pulled, can be connected to a ball 100 or 102, as is known in the art.

OPERATION

First, to begin with the assembly 20 in a storage state, the slide bar 54 can be disengaged from the front receiver tube 26. The pin 64 can be disengaged from front receiver tube 27 and be inserted in the bores in the walls 55 and 56 of bar 54, and held thereto by spring clip 66. Intermediate ensemble 53 can likewise be disengaged from mounting ensemble 75a, and in such disengagement the second lock pin 84 can be inserted in a pair of the aligned bores 80 in the sides 76 of mount tube 75, and held by clip 86 so that it does not become lost. Ensembles 53 and 75a can be easily and conveniently stored in the bed of a truck or trunk of a car.

To mount the assembly 20, intermediate ensemble 53 can be grasped and bar 54 telescopically slid within the front receiver tube 26 so that the first hitch pin 64 can be slid through the bores in bar 54, tube 26, and angle legs 28 and 30 into the locking position previously described, and the spring clip 66 inserted through pin 64 to hold slide bar 54 to tube 26 and further hold tube 26 to the legs 28 and 30 of the angles 32 and 34, as shown in FIGS. 1, 2, and 5. It can thus be seen that should the welds holding the angles 32 and 34 to the front receiver tube 26 break, the pin 64 will nevertheless hold the front receiver tube 26 to the angles 32 and 34 and thus continue to hold the receiver tube 26, bar 54 and the angles 32 and 34 to the vehicle bumper 22 by virtue of the connection of the angles 32 and 34 to the bumper 22 by bolts 40 and 46 and nuts 44 and 50.

Next, with the hitch pin 84 disengaged from rear receiver tube 70, the mount tube 75 can be telescopically slid through the upper or lower opening of front receiver tube 70, and positioned to place the mount plate 92 at a selected location either above or below the tube 70. For purposes of illustration, the position of the plate 92 above tube 70 shall be first selected. The mount tube 75 is thus grasped to extend vertically with the mount plate 92 in the upper position, and then the lower end of mount tube 75 is moved above tube 70 to be aligned therewith so that the mount tube 75 is telescopically slid within tube 70 to a position whereby a selected pair of holes 80 of the mount tube 75 are aligned with the holes 71a of tube 70 to thus allow the hitch pin 84 to slide through the said holes 80 and 71a and be secured by spring clip 86, as shown in FIGS. 2 and 3.

Thus by selecting a pair of the holes 80 in the mount tube 75 the mount plate 92 and its hitch balls 100 and 102 can be positioned at any one of various selected heights relative to the receiver tube 70 and thus relative to the vehicle bumper 22 or other vehicle portion to which the receiver tube 26 can be mounted.

Next, the bolt 89 can have its shaft inserted through the aligned bores 74 in the walls 72 and 73 of receiver tube 70, and through the corresponding pair of bores 88 in mount tube walls 77 and 78, and secured by nut 90, to further hold mount tube 75 to receiver tube 70. The telescopic fit of bolt 89 prevents sliding of mount tube 75 along the pin 84, while pin 84 prevents sliding of mount tube 75 along bolt 89, so that mount tube 75 is stably mounted within rear receiver tube 70.

To position the mount plate 92 beneath the receiver tube 72, the mount tube 75 is removed from the position shown in FIG. 2 by disengaging the hitch pin 84 and the bolt 89, and lifting the mount tube 75 to remove it from receiver tube 70, and then turning the mount tube 75 upside down so that the plate 92 is in the lower position. To obtain the mounting such as shown in FIG. 4, the mount tube 75 is rotated about its axis so that the ball 100 is positioned towards the front side of the tube 70 and the hitch ball 102 to the rear thereof. The mount tube 75 is moved beneath receiver tube 70 and tube 75 is inserted within the lower end of tube 70 and slid therein so that a selected pair of holes 80 in mount tube 75 can be aligned with the pair of holes 71a in the walls 71 of tube 70 to thus allow the pin 84 to be inserted through the said aligned holes, so that the spring clip 86 can be attached to pin 84 to hold mount tube 75 to tube 70, with one of the selected position being shown in FIG. 4. Bolt 89 can then be inserted through the corresponding bores 74 and 88 and secured by nut 90 to help hold mount tube 75 to receiver tube 70 and to prevent tube 75 from sliding along pin 84 within tube 70. Pin 84 again acts to prevent sliding of tube 75 along bolt 89 to prevent wobbling of tube 75 within tube 70.

In FIG. 4, ball 102 has had its position relative to the plate 92 shown in FIG. 2 reversed by disengaging nut 118 from bolt 114 and removing bolt 114 from the bore 94 and positioning ball 102 on the interior side of plate 92 so that the bolt 114 can be extended through bore 94 and the nut 118 and washer 122 secured so as to hold the ball 102 firmly in the position shown in FIG. 4. The coupler 24 can then be firmly mounted to the ball 102 as known in the art.

Mount tube 75 is provided with four pairs of holes 80 and four pairs of bores 88 so that mount plate 92 can be placed at four different heights above rear receiver tube 70 depending on which pair of holes 80 and corresponding bores 88 are selected to receive pin 84 and bolt 89 respectively, and at four different heights below tube 70 again depending upon which pair of holes 80 and bores 88 are selected. More holes 80 and bores 88 can be provided to allow more selection of positions. Mount tube 75 and slide bar 59 can be longer or shorter than shown.

As noted, the hitch balls 100 and 102 are of different sizes, and versatility in size selection is thus offered. Either one of the hitch balls 100 or 102 can be selected for the rear position. For example referring the mount plate 92 being in the upper position as shown in FIGS. 1 and 2, rotating the mount tube 75 before its insertion within tube 70 so that the selected ball 100 or 102 is positioned towards the rear of the hitch assembly permits ease in selection of the ball 100 or 102 for the rear position. With the position of the ball 100 or 102 so selected, the mount tube 75 is then inserted within the tube 70 and secured. Likewise when the plate 92 is placed in the lower position relative to mount tube 75 can, tube 75 can, before insertion within tube 70, be rotated about its axis to have either one of the balls 100 or 102 located in the rearward position and the mount tube 75 can be inserted within tube 70 and secured. The selected rearward ball can then be secured to project from the interior side of plate 92 as previously described for ball 102.

Thus by use of the single hitch pin 84 in connection with the vertical mount tube 70, a full range of upper and lower positions for the mount plate 92 and thus for the hitch balls 100 and 102 can be selected with the plate 92 sturdily mounted in all of the selected positions.

The bolt 89 provides additionally stability by preventing wobbling of tube 75, and acts as a safeguard as well should pin 84 be disengaged by a vandal or through accident.

The exterior cross-section of vertical mount tube 75 fits wholly within the receiver tube 70 to be totally enclosed therein with the telescopic fit allowing the receiver tube 70 to provide sturdy and secure support for the mount tube 75 to offer strong resistance to movement of the tube 75 in all directions.

This is all provided with the feature of having two locations for the hitch balls on the mount plate 92 so that merely by rotating the mount tube 75 about its axis one or the other of the different sized hitch balls 100 or 102 can be selected for engagement with the coupler 24.

There are various changes and modifications which may be made to applicant's invention as would be apparent to those skilled in the art. However, these changes or modifications are included in the teaching of applicant's disclosure, and it is intended that the invention be limited only by the scope of the claims appended hereto.

I claim:

1. A hitch assembly for attachment to a vehicle to tow objects, such as trailers, over a road, pavement, or the ground comprising:
    (a) a tubular receiver member having continuous walls of approximately rectangular cross section, means for mounting the receiver member to the vehicle so that the receiver member is substantially vertical relative to the road, pavement or ground therebeneath;
    (b) a tubular mount member of approximately rectangular cross section and having continuous walls;
    (c) a mount plate, and means for securing the mount plate to the mount member;
    (d) the receiver member and the mount member being shaped so that the receiver member telescopically receives the mount member with the walls of the receiver tube member flush against the walls of the mount member so that when torque is applied to the mount member the receiver member walls engage the mount member walls to resist rotary movement of the mount member relative to the receiver member; and
    (e) means for holding the mount member within the receiver member at a selected position comprising one of those members having a passageway extending transversely therethrough, and the other such member with a plurality of transverse passageways therethrough positioned so that selected passageways in the member with the plurality of passageway can be aligned with the passageway in the other member, and a locking part for passing through the said aligned passageways to hold the two members in a fixed relationship, wherein the receiver member is the rear receiver member, and the means for mounting the rear receiver member to the vehicle comprises a front receiver tube, the front receiver tube being welded to the vehicle to be substantially horizontal relative to the ground, road, or pavement, the rear receiver member having an extension bar secured thereto, the said bar being sized to be slidingly received within the front receiver tube so that part of it is enclosed by the walls of the front receiver tube, and wherein the means for mounting the front receiver tube to the vehicle comprises a pair of attachment members for connection to the vehicle, the attachment members having depending legs having holes therethrough, said holes being aligned with one another, the said attachment members being angle shaped and having substantially horizontal legs with means for attaching the horizontal legs to the vehicle, the front receiver tube having a pair of transverse holes for alignment with the two holes in the depending legs, and the bar having a transverse passageway extending therethrough for alignment with the holes in the depending legs of the attachment members and the holes in the front receiver tube so that a locking member can pass through said bar passageway and holes in the front receiver tube and holes in the depending legs to engage the bar to the front receiver tube and to the attachment members, and wherein the vehicle has a plate with holes therethrough, and wherein the substantially horizontal legs of the angle members have holes therethrough for alignment with the said vehicle's holes so that a fastening member can pass through the said holes in the angle members and through the vehicle plate to fasten the angle members to the vehicle.

2. The structure of claim 1 wherein the said attachment members are angle shaped and have substantially horizontal legs with means for attaching the horizontal legs to the vehicle.

3. The structure of claim 2 wherein the vehicle has a plate with holes therethrough, and wherein the substantially horizontal legs of the angle members have holes therethrough for alignment with the said vehicles holes so that a fastening member can pass through the said holes in the angle members and through the vehicle plate to fasten the angle members to the vehicle.

4. A hitch assembly for attachment to a vehicle to tow objects such as trailers, over a road, pavement or the ground comprising:
   (a) a front receiver tube having a pair of aligned holes in its walls;
   (b) a pair of angle irons for mounting to the vehicle so that legs on each of the angles depend substantially vertically from the vehicle relative to the ground, road or pavement therebeneath and have holes therethrough the said holes being aligned with one another;
   (c) an intermediate receiver ensemble comprising a slide bar with a transverse passageway therethrough, a mount plate for hitch balls secured to an end of the mount member and extending transversely relative to the mount member, the bar sized to be slidingly received within the front receiver tube so that the passageway in the bar can be aligned with the pair of openings in the front receiver tube and with the openings in the depending legs of the angles so that a first lock pin can pass therethrough, and further comprising a rear receiver tube having an open lower end and an open upper end, the second receiver tube being mounted to the bar to be substantially perpendicular thereto so that the rear receiver tube is substantially vertical to the ground, road or pavement therebeneath when the slide bar is mounted within the front receive tube, the rear receiver tube having a pair of aligned openings therethrough; and
   (d) a mounting ensemble comprising an elongated mount member having a plurality of passageway therethrough, the mount member being sized so that it can be inserted through the opening in the top of the second receiver tube or through the bottom opening of the receiver tube and in either instance moved so that a selected passageway in the mounting member can be aligned with the openings in the rear receiver tube so that a second lock pin can be passed through the pair of openings in the rear receiver tube and through the passageway of the mount member to lock the mount member and the mount plate so that the mount plate can be mounted at selected positions either above or below the second receiver tube.

5. The structure of claim 4 wherein the mount plate extends transversely relative to the mount member and extends on opposite sides of the mount member, and further comprising one hitch ball mounted to the mount plate on one side of the mount member and another hitch ball mounted to the mount plate on the opposite side of the mount member.

6. The structure of claim 5 wherein the hitch balls are releasably mounted to the mount plate so that they can be attached to the mount plate so that the ball extends on the side of the mount plate exterior of the mount member or the side of the mount plate interior of the mount member.

7. The structure of claim 4 further comprising the rear receiver tube having a second pair of aligned openings extending through it, the said openings extending in a direction approximately perpendicular to the direction of the first pair of aligned openings, and the mount member having a second set of a plurality of passageways therethrough which extend approximately perpendicular to the first set of passageways extending therethrough, so that when the mount member is inserted through either the lower or the upper opening of the rear receiver tube a selected passageway from the second set of passageways through the mount member can be aligned with the second pair of openings through the rear receiver tube so that a lock rod can pass therethrough to further lock the mount member to the rear receiver tube.

* * * * *